(12) United States Patent
Amouroux

(10) Patent No.: US 8,850,933 B2
(45) Date of Patent: Oct. 7, 2014

(54) HAND-OPERATED PLIERS

(75) Inventor: Christophe Amouroux, Roubia (FR)

(73) Assignees: Christophe Amouroux, Roubia (FR); Henri Lammens, Villemoustaussou (FR); Carole Vermersch, Marseille (FR); Yves Dorcy, St. Dizier l'eveque (FR); Geraud Dorcy, St. Dizier l'eveque (FR); Yannick Lefebvre, Narbonne (FR); Alain Vanneyre, Salon de Provence (FR)

( * ) Notice: Subject to any disclaimer, the term of this patent is extended or adjusted under 35 U.S.C. 154(b) by 395 days.

(21) Appl. No.: 13/001,452

(22) PCT Filed: Jun. 24, 2009

(86) PCT No.: PCT/FR2009/051206
§ 371 (c)(1),
(2), (4) Date: Mar. 15, 2011

(87) PCT Pub. No.: WO2009/156693
PCT Pub. Date: Dec. 30, 2009

(65) Prior Publication Data
US 2011/0154578 A1 Jun. 30, 2011

(30) Foreign Application Priority Data
Jun. 27, 2008 (FR) .................................... 08 54305

(51) Int. Cl.
*B25B 7/22* (2006.01)
*B26F 1/00* (2006.01)
*B26F 1/36* (2006.01)

(52) U.S. Cl.
CPC ......... *B26F 1/0015* (2013.01); *B26F 2001/365* (2013.01); *B26F 1/36* (2013.01)
USPC .............................................. 81/426.5; 7/132

(58) Field of Classification Search
USPC ................ 81/415, 417, 418, 426, 426.5, 487; 7/125, 157, 170, 132, 900
See application file for complete search history.

(56) References Cited

U.S. PATENT DOCUMENTS

| 5,398,718 A * | 3/1995 | Roinick, Sr. ................... 137/318 |
| 5,893,201 A * | 4/1999 | Myers .............................. 29/268 |
| 6,430,767 B1 * | 8/2002 | Ramos et al. ...................... 7/125 |

OTHER PUBLICATIONS

International Search Report of PCT/FR2009/051206, Dated Jan. 12, 2010.

\* cited by examiner

*Primary Examiner* — Robert Scruggs
(74) *Attorney, Agent, or Firm* — Laurence A. Greenberg; Werner H. Stemer; Ralph E. Locher

(57) ABSTRACT

Hand-operated pliers for piercing an irrigation pipe and fitting such an irrigation pipe with a drip emitter, include two jaws, a device for piercing the pipe as the two jaws are brought closer together and a device for fitting a drip emitter onto the pierced pipe while the two jaws are being brought closer together, for fitting such a pipe with such a drip emitter.

15 Claims, 2 Drawing Sheets

HAND-OPERATED PLIERS

BACKGROUND OF THE INVENTION

Field of the Invention

The present invention relates to hand-operated pliers for piercing an irrigation pipe and fitting such an irrigation pipe with a drip emitter.

This invention concerns the field of tooling which is used within the context of the development of green spaces, and will be applicable particularly when the objective is to install an irrigation system for the plantations which constitute such a green space.

When the objective is to provide irrigation of this type, is it known to use a particularly efficient system consisting of ensuring that the water is distributed drop by drop. An irrigation system of this type is at least partly constituted by an irrigation pipe which is equipped with a plurality of drip emitters.

According to a first embodiment, drip emitters of this type can be fitted on the irrigation pipe, according to an automatic method, which is described in particular in document FR-2.587.925, and is implemented during manufacture in a factory of such an irrigation system.

An embodiment of this type has the advantage of ensuring that the drip emitters are positioned regularly along the irrigation pipe. However, this regularity is not in any way adapted to the real situation of the ground, and the location of the plantations to be irrigated.

Thus, and according to a second embodiment, it is known firstly to implant an irrigation pipe amongst the plantations to be irrigated, and, only then, to fit each drip emitter individually in the exact location where it is necessary to ensure that water is distributed.

An embodiment of this type is particularly onerous, and requires piercing of the pipe in a first stage, and fitting of the drip emitter in a second stage.

In this respect it will be noted that, in order to carry out the piercing of the pipe, it is known to use a tool which is in the form of manual pliers, comprising firstly a first jaw which is provided with a cradle for receipt of the pipe, and secondly a second jaw which is provided with a punch which can be displaced in the direction of the cradle, under the effect of manipulation of the pliers. These pliers also comprise a system for adjustment of the position of the punch.

Apart from the fact that these pliers make it possible only to pierce the pipe, the adjustment system is particularly exposed, with the result that, during use of the pliers, an accumulation occurs of earth, vegetation and other undesirable components which impede the displacement of the punch, or even block it.

Furthermore, and since these pliers make it possible only to pierce the pipe, the operator who is in charge of producing the irrigation system must ensure that each drip emitter is fitted individually on this pipe. This fitting is carried out manually, by forcing a stud which is provided with grooves inside the piercing previously carried out.

Fitting of this type is particularly onerous, tiring and laborious, and can also cause injuries to the operator, and particularly his hands. It will be appreciated that this phenomenon is amplified during the winter season, when the pipe, which is usually made of a plastic material, has increased hardness.

BRIEF SUMMARY OF THE INVENTION

The object of the present invention is to eliminate the disadvantages of the devices according to the prior art.

For this purpose, the invention relates to hand-operated pliers for piercing an irrigation pipe and fitting such an irrigation pipe with a drip emitter, these pliers comprising two jaws and a means for piercing the pipe as these two jaws are brought closer together, characterized in that they further comprise a means for fitting of a drip emitter on the pierced pipe, and for doing so under the effect of the two jaws being brought closer together, and with a view to fitting such a pipe with such a drip emitter.

According to another characteristic, the means for fitting the drip emitter comprises a means which equips a first jaw, and is designed to retain this drip emitter before it is fitted on the pierced pipe.

This retention means comprises at least one spring plate, preferably of the retractable or detachable type, which is supported against the drip emitter, preferably laterally.

In fact, more particularly, a retention means of this type comprises two plates, which form pliers, and between which said drip emitter is gripped.

According to an additional characteristic, the means for fitting the drip emitter comprises a means which is defined on a first jaw, and is designed to receive a drip emitter of this type. This means for receipt is at least partly constituted by an opening, in particular in the form of a cut-out which is defined on the free end of the first jaw, and inside which part of the drip emitter is positioned.

Another characteristic concerns the fact that the pliers comprise a means, which equips the second jaw, and is designed to receive an irrigation pipe in a first position for piercing of this pipe, as well as in a second position for fitting of a drip emitter on this pierced pipe.

In fact, a means for receipt of this type can be firstly constituted by a cradle for receipt of the pipe, and secondly it can be mobile relative to the first jaw, between a first position for piercing of this pipe and a second position for fitting of the drip emitter on the pierced pipe.

In addition, these pliers comprise a means for returning the means for receipt, from the first position for piercing of the pipe, into the second position for fitting of a drip emitter on this pipe.

Finally, according to an additional characteristic of these pliers, they comprise a means for adapting the form and/or the dimension of the means for receipt of a pipe to that of this pipe.

The advantages of the present invention consist of the fact that the pliers make it possible to provide the piercing of a pipe, as well as the fitting of a drip emitter on this pipe, by means of a single hand-operated tool.

In addition, the pliers according to the invention make it possible to pierce a pipe and equip it with a drip emitter simply, and more particularly according to two rapid successive manipulations.

The use of these pliers also makes it possible to equip a pipe with a plurality of drip emitters rapidly and accurately, whilst minimizing the fatigue and the risks of traumatism for the operator.

According to another advantage of the pliers, their design is simple and robust, which makes possible easy use and maintenance, as well as an increased service life in comparison with the pliers according to the prior art.

According to yet another advantage, the pliers comprise a plurality of adjustment means which make it possible to adapt the use of these pliers to the nature, form and/or the dimension of the pipe and/or of the drip emitter. This permits in particular adaptation of the pliers to irrigation pipes with different diameters.

Adjustment means of this type also make it possible to adapt the use of these pliers to the climatic and seasonal conditions of its use.

Finally, according to a particularly advantageous embodiment of these pliers, they comprise a means for receipt of a pipe of a type which is mobile relative to the piercing means, and to the means for fitting of the drip emitter. This means for receipt is completed by a means which ensures that the pipe is returned from a piercing position to a position for fitting of the drip emitter, which, advantageously and automatically, permits the passage of the pipe from a piercing position to a position for fitting of the drip emitter.

Other objectives and advantages of the present invention will become apparent during the following description, which relates to embodiments which are provided purely by way of indicative and non-limiting examples.

The understanding of this description will be facilitated by referring to the attached drawings, in which:

DESCRIPTION OF THE INVENTION

Figure 1:
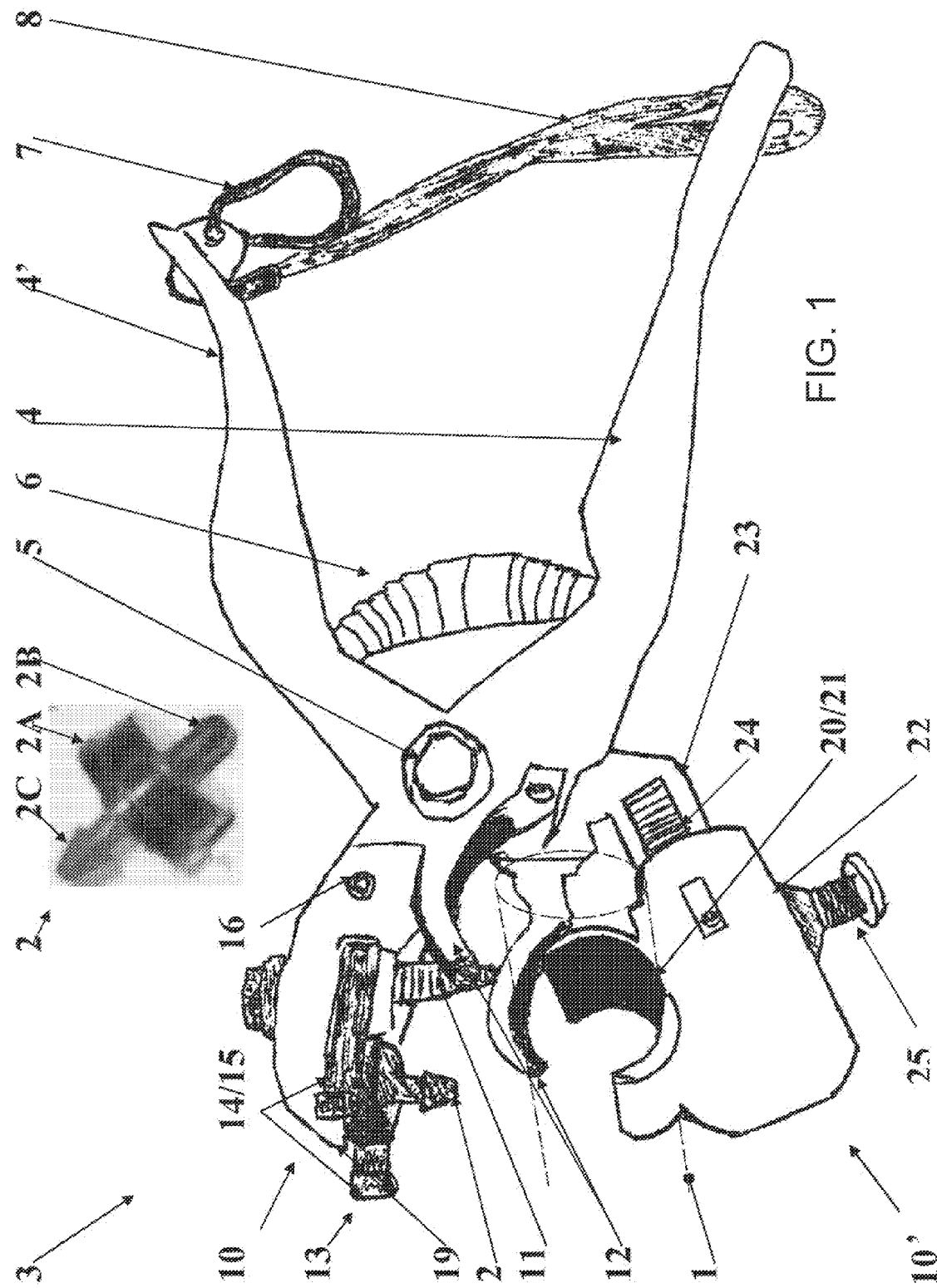
FIG. 1 is a schematized general view of the pliers which are the subject of this invention, and according to a preferred embodiment.

The present invention relates to the field of tooling which is used within the context of the development of green spaces.

This tooling will be applicable particularly when the objective is to install an irrigation system for the plantations which constitute such a green space.

An irrigation system of this type comprises firstly at least one irrigation pipe 1 (represented in broken outline in FIG. 1), and secondly a plurality of drip emitters 2 which equip such an irrigation pipe 1.

In a known manner, a drip emitter 2 of this type comprises firstly a body 2A which is in the form of a thick disk, and also, on one of the sides of this body 2A, a tube 2B which is designed to be engaged in a piercing which an irrigation pipe 1 comprises, and, additionally, on the other side of this body 2A, a nozzle 2C for the distribution of water.

The present invention thus relates to tooling which is constituted by hand-operated pliers 3 designed to equip such an irrigation pipe 1 with such a drip emitter 2.

As can be seen in the attached figures, pliers of this type 3 comprise a pair of arms 4, 4' which are articulated one 4 relative to another 4' (more particularly one 4 relative to the other 4') around a shaft 5, and are designed to be manipulated by an operator for actuation of the pliers 3. These arms 4, 4' can also be completed firstly by a spring 6, which is designed to ensure that these arms 4, 4' open, against manipulation by the operator, and secondly by a means 7 to immobilize these arms 4, 4' in the position of closure, corresponding in particular to a position for putting the pliers 3 away, or also by a carrying strap 8 or the like.

Pliers 3 of this type also comprise two jaws 10, 10', which are each located on the extension of one of these arms 4, 4', and are designed to be brought closer together under the effect of manipulation of the pliers 3 by the operator.

According to another characteristic of the present invention, the pliers 3 comprise a means 11 for piercing the pipe, under the effect of bringing these two jaws 10, 10' closer together.

As can be seen in the appended figures, a piercing means 11 of this type is constituted by a punch which equips a first jaw 10.

Advantageously, a punch of this type is of an adjustable or detachable type, for the purpose of adapting the depth of piercing to the characteristics of the pipe 1 to be pierced. In this respect, it will be noted that a preferred embodiment consists of a punch of this type being designed so that it can be screwed on/unscrewed for the purpose of adaptation of this type.

According to an additional characteristic of the invention, a piercing means 11 of this type can be completed by a means 12 for wedging the pipe 1 to be pierced, in a piercing position.

As can be seen in the attached figures, a wedging means 12 of this type can, at least partly, be constituted by at least one fixed hook which equips the second jaw 10', or (and preferably) by two fixed hooks which extend on both sides of this second jaw 10'.

In this respect, it should be noted that a wedging means 12 of this type is more particularly designed to wedge irrigation pipes 1 with a large diameter, whereas for irrigation pipes 1 with a small diameter, the pipes are wedged by a means 20 for receipt of such a pipe 1, as will be described hereinafter, and which then in itself constitutes such a wedging means.

According to the invention, these pliers 3 also comprise a means 13 for fitting of a drip emitter 2 on the pierced pipe 1, under the effect of bringing the two jaws 10, 10' closer to one another.

In fact, and advantageously, a drip emitter 2 of this type is fitted on a piercing previously created by means of the piercing means 11 which these same pliers 3 comprise.

According to another characteristic, a means 13 of this type for fitting of a drip emitter 2 is at least partly defined on the first jaw 10 of the pliers 3, and more particularly in the vicinity of the free end of this first jaw 10.

According to a preferred embodiment, the means 11 for piercing the pipe 1 and the means 13 for fitting the drip emitter 2 are juxtaposed on the first jaw 10 of these pliers 3, as can be seen in the attached figures.

In fact, the means 13 for fitting the drip emitter 2 comprises a means 14 which equips the first jaw 10, and is designed to retain this drip emitter 2 before it is fitted on the pierced pipe 11.

In this respect, it will be observed that a retention means 14 of this type comprises at least one spring plate 15, which extends at the front of the first jaw 10, and is supported against the drip emitter 2, preferably laterally.

However, and according to a preferred embodiment, a retention means 14 of this type is in fact constituted by two spring plates 15 of this type, which form pliers, and between which said drip emitter 2 is gripped.

A spring plate 15 of this type is preferably of the retractable or detachable type (in particular so that it can be replaced), such that it can be adapted to drip emitters 2 with different sizes and/or forms.

An additional characteristic then consists of the fact that a retention means 14 of this type is completed by a means 16 which is designed to immobilize reversibly at least one spring plate 15, relative to the first jaw 10.

A means 16 for immobilization of this type is preferably constituted by a tightening screw or the like.

According to another characteristic, the means 13 for fitting the drip emitter 2 comprises a means 17 which is defined on a first jaw 10 (and more particularly at the free end of this jaw 10), and is designed to receive a drip emitter 2 of this type.

According to a first embodiment (not shown), a means 17 for receipt of this type can consist of the aforementioned retention means 14.

However, and according to a preferred embodiment of the invention which is illustrated in the attached figures, a means 17 for receipt of this type is at least partly constituted by an opening 18 which is defined in the first jaw 10 (in particular in the form of a cut-out which is defined on the free end of this first jaw 10), and inside which part of the drip emitter 2 is positioned (more particularly a flow nozzle 2C which a drip emitter 2 of this type comprises).

This means 17 for receipt can also be constituted by at least one support surface 19, against which this drip emitter 2 is supported (and in particular the body 2A of this drip emitter 2).

A means 17 for receipt of this type then completes a means 14 for retention (as previously described), which is then also designed to retain the drip emitter 2 in position on this means 17 for receipt, before this drip emitter 2 is fitted on the pierced pipe 1.

According to another characteristic of the present invention, the pliers 3 comprise a means 20, which equips the second jaw 10', and is designed to receive an irrigation pipe 1 in a first position for piercing of this pipe 1, as well as in a second position for fitting of a drip emitter 2 on this pierced pipe 1.

According to a first embodiment, not shown, a means 20 for receipt of this type is constituted firstly by a first cradle 21 for receipt of the irrigation pipe 1 in a first position for piercing of this pipe 1, this first cradle 21 being situated opposite the means 11 for piercing of this pipe 1.

Also, this means 20 for receipt is constituted by a second cradle for receipt of this pipe 1, in the second position for fitting of the drip emitter 2, this second cradle being situated opposite the means 13 for fitting of this drip emitter 2 on this pipe 1.

Thus, the procedure for use of pliers 3 according to this first embodiment consists of:
  opening the jaws 10, 10' and positioning the pipe 1 to be pierced in the first cradle 21 and in a first piercing position;
  piercing this pipe 1 by bringing the two jaws 10, 10' closer together, by manipulating the arms 4, 4' of the pliers 3;
  opening the jaws 10, 10' and displacing the pierced pipe 1 in order to bring it into the second cradle, and into a second position for fitting of the drip emitter 2;
  fitting the drip emitter 2 by bringing the two jaws 10, 10' closer together, by manipulating the arms 4, 4' of the pliers 3;
  opening the jaws 10, 10' in order to permit extraction of the pipe 1 which is pierced and equipped with the drip emitter 2.

Figure 3:
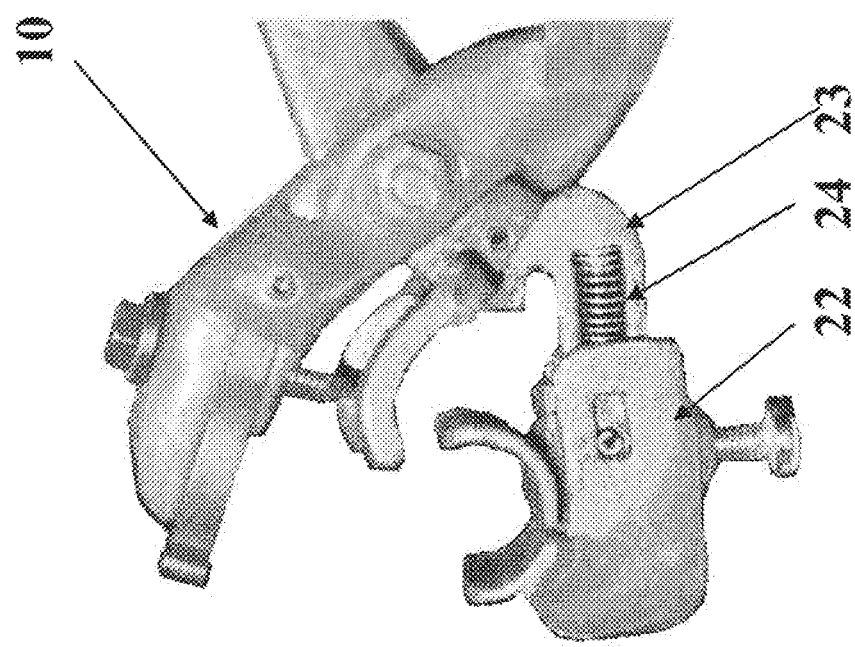
FIG. 3 is a schematized detailed view of the jaws of the pliers illustrated in FIG. 1, in a second position of the means for receipt corresponding to a position for fitting of a drip emitter on the pipe.
Figure 2:
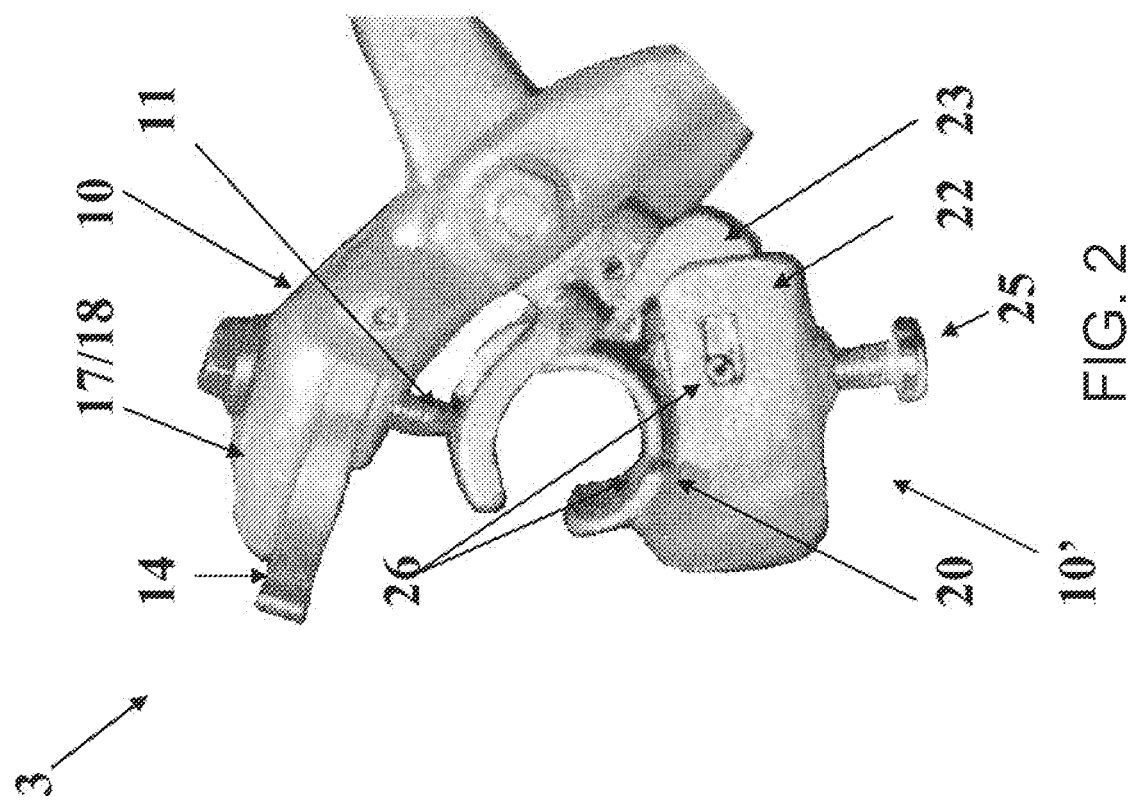
FIG. 2 is a schematized detailed view of the jaws of the pliers illustrated in FIG. 1, in a first position of the means for receipt corresponding to a position for piercing of a pipe.

FIGS. 1 to 3 show a preferred embodiment of the invention in which the pliers 3 comprise a means 20 for receipt of a pipe 1 constituted by a cradle 21 for the receipt of this pipe 1.

According to another characteristic, this means 20 for receipt is mobile relative to the first jaw 10, between a first position for piercing of this pipe 1 (FIG. 2) and a second position for fitting of the drip emitter 2 on the pierced pipe 1 (FIG. 3).

In this respect, it will be noted that, in order to provide mobility of this type of the means 20 for receipt, the second jaw 10' of the pliers 3 comprises firstly a mobile carriage 22 which receives this means 20 for receipt, and, secondly, a support 23 on which said carriage 22 is fitted such as to be displaced, and more particularly such as to slide.

It is more particularly the mobility of this carriage 22 which advantageously allows the means 20 for receipt which is associated with this carriage 22 to adopt the aforementioned first and second positions.

According to an additional characteristic, the pliers 3 also comprise a means 24 for return of the means 20 for receipt from the first position for piercing of the pipe 1 into the second position for fitting of a drip emitter 2 on this pipe 1.

In fact this means 24 for return (more particularly in the form of a spring) is interposed between the support 23 and the carriage 22, such as to thrust the carriage back from said first position for piercing of the pipe 1, into said second position for fitting of the drip emitter 2.

Thus, the procedure for use of pliers 3 according to this second embodiment consists of:
  opening the jaws 10, 10' and positioning the pipe 1 to be pierced in the cradle 21 of the means 20 for receipt;
  bringing the means 20 for receipt (more particularly the carriage 22) into the first position for piercing of the pipe 1, before or (and preferably after) having positioned the pipe 1 in the cradle of the means 20 for receipt;
  retaining the means 20 for receipt and the pipe 1 in the piercing position;
  piercing this pipe 1 by bringing the two jaws 10, 10' closer together, by manipulating the arms 4, 4' of the pliers 3;
  opening the jaws 10, 10' and bringing the means 20 for receipt (more particularly having it brought under the effect of the return means 24) into the second position for fitting of the drip emitter 2;
  fitting the drip emitter 2 by bringing the two jaws 10, 10' closer together, by manipulating the arms 4, 4' of the pliers 3;
  opening the jaws 10, 10' in order to permit extraction of the pipe 1 which is pierced and equipped with the drip emitter 2.

As previously stated, a step of this procedure consists of bringing the means 20 for receipt (in fact the carriage 22) into, and retaining it in the first position for piercing of the pipe 1. Bringing into position and retention of this type can advantageously be carried out by supporting the carriage 22 against a support surface, which in particular is defined on the ground or on the knee of the operator.

As previously stated, the piercing of the pipe 1 requires retention of the means 20 for receipt in the first piercing position. Retention of this type can be carried out manually.

However, and according to a preferred embodiment of the invention, the pliers 3 comprise a means 25 which is designed for retention of this type, more particularly against the means 24 for return of the means 20 for receipt, in the second position for fitting of a drip emitter 2.

As can be seen in FIGS. 1 to 3, a retention means 25 of this type can be constituted by a tightening screw or the like which is associated with the carriage 22, and is designed to co-operate with the support 23 for the purpose of retention of this type.

According to an additional characteristic, the pliers also comprise a means 26 for adapting the form and/or the dimension of the means 20 for receipt of a pipe 1 to that of this pipe 1.

In this respect, it will be observed that, irrespective of the embodiment of the pliers 3, the latter comprise a means 20 for receipt constituted by at least one cradle 21, 21'.

A cradle of this type 21, 21' then comprises two parts, one of which at least is mobile relative to the other, thus advantageously making it possible to adapt a cradle 21, 21' of this type (and consequently the means 20 for receipt) to the form and/or dimension of the irrigation pipe 1.

In this respect, it will be noted that the presence of this means 26 for adaptation of the form and/or the dimension of the means 20 for receipt of a pipe 1 to that of this pipe 1 advantageously makes it possible to prevent crushing of the irrigation pipe 1 during the piercing and fitting of the drip emitter 2.

Finally, and according to another characteristic, a cradle 21, 21' of this type is constituted by a gutter, and has a form in the shape of a "V", or (and preferably) a form in the shape of a "U".

In this case also, the particular form of the gutter of this cradle 21, 21' advantageously makes it possible to prevent crushing of the irrigation pipe 1 during the piercing and fitting of the drip emitter 2.

The invention claimed is:

1. Hand-operated pliers for piercing an irrigation pipe and fitting the irrigation pipe with a drip emitter, the pliers comprising:
    first and second jaws;
    piercing means for piercing the pipe as said two jaws are brought closer together;
    fitting means for fitting a drip emitter on the pierced pipe upon said two jaws being brought closer together for equipping the pipe with the drip emitter; and
    receiving means disposed at said second jaw for receiving an irrigation pipe in a first position for piercing the pipe and in a second position, different from said first position, for fitting a drip emitter on the pierced pipe, said receiving means configured to be entirely slid along said second jaw between said first and second positions.

2. The hand-operated pliers according to claim 1, wherein said piercing means include a punch disposed at said first jaw.

3. The hand-operated pliers according to claim 1, which further comprises means cooperating with said piercing means for wedging the pipe in a piercing position.

4. The hand-operated pliers according to claim 1, wherein:
    said fitting means include retaining means disposed at said first jaw for retaining the drip emitter before being fitted on the pierced pipe; and
    said retaining means include at least one spring plate supported against the drip emitter.

5. The hand-operated pliers according to claim 4, wherein said at least one spring plate is supported against the drip emitter laterally.

6. The hand-operated pliers according to claim 4, wherein said at least one spring plate is two spring plates forming pliers between which the drip emitter is gripped.

7. The hand-operated pliers according to claim 1, wherein:
    said fitting means include means disposed at said first jaw for receiving a drip emitter; and
    said fitting means are at least partly constituted by an opening inside which part of the drip emitter is positioned.

8. The hand-operated pliers according to claim 7, wherein said opening is a cut-out in a free end of said first jaw.

9. The hand-operated pliers according to claim 1, wherein said receiving means include a cradle for receiving the pipe, said cradle configured to be entirely slid along said second jaw with said receiving means, between said first and second positions.

10. The hand-operated pliers according to claim 9, wherein said cradle includes a gutter.

11. The hand-operated pliers according to claim 10, wherein said gutter is U-shaped.

12. The hand-operated pliers according to claim 9, wherein said cradle is formed in one-piece configured to be slid along said second jaw with said receiving means, between said first and second positions.

13. The hand-operated pliers according to claim 1, which further comprises returning means for returning said receiving means from said first position for piercing the pipe to said second position for fitting the drip emitter on the pipe.

14. The hand-operated pliers according to claim 1, which further comprises adapting means for adapting at least one of a shape or a dimension of said receiving means to the pipe.

15. The hand-operated pliers according to claim 1, which further comprises:
    a support; and
    a mobile carriage receiving said receiving means, said mobile carriage configured to be displaced on said support for moving said receiving means between said first and second positions.

* * * * *